Sept. 16, 1969     R. K. UNTER     3,467,409
LOCKING MEANS FOR TRAILER COUPLINGS
Filed Jan. 2, 1968     2 Sheets-Sheet 1
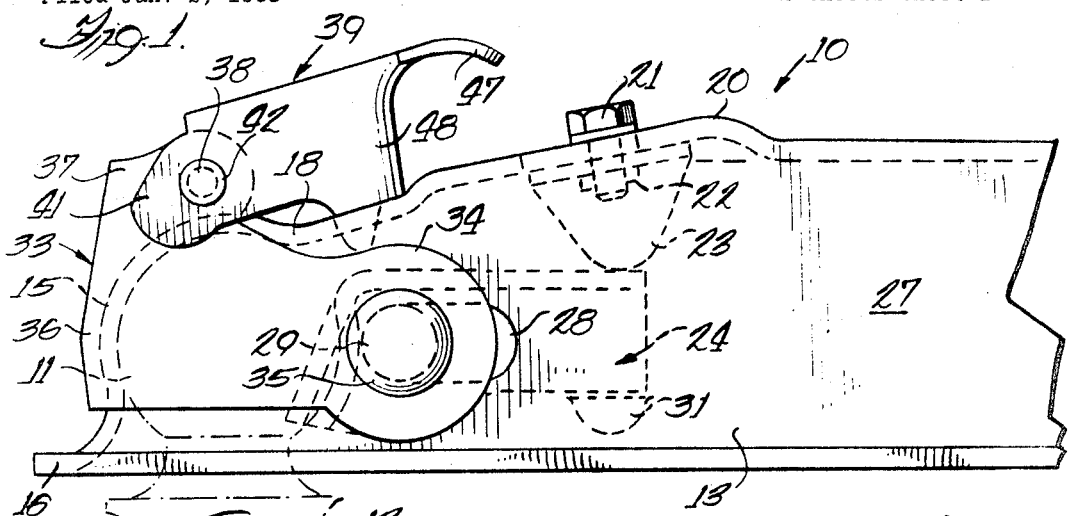
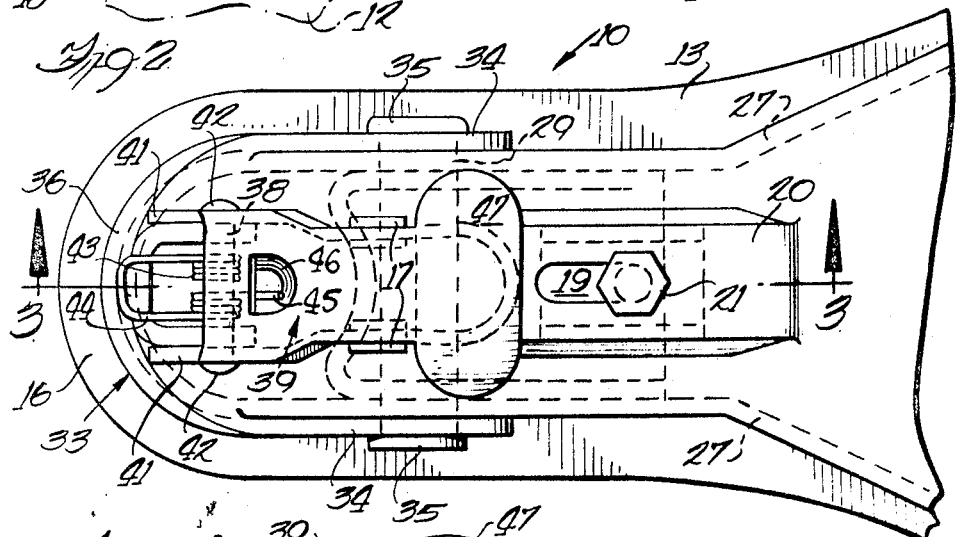
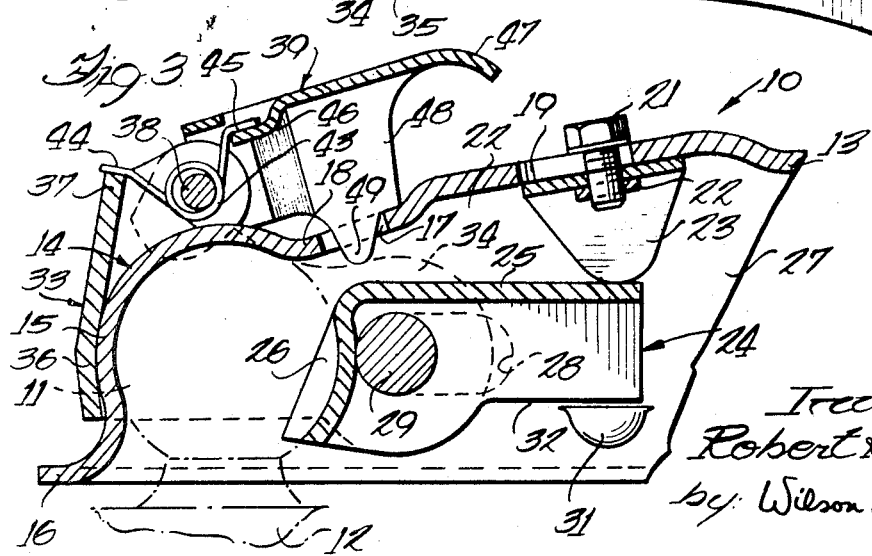
Inventor
Robert K. Unter
by Wilson & Geppert
Atty's

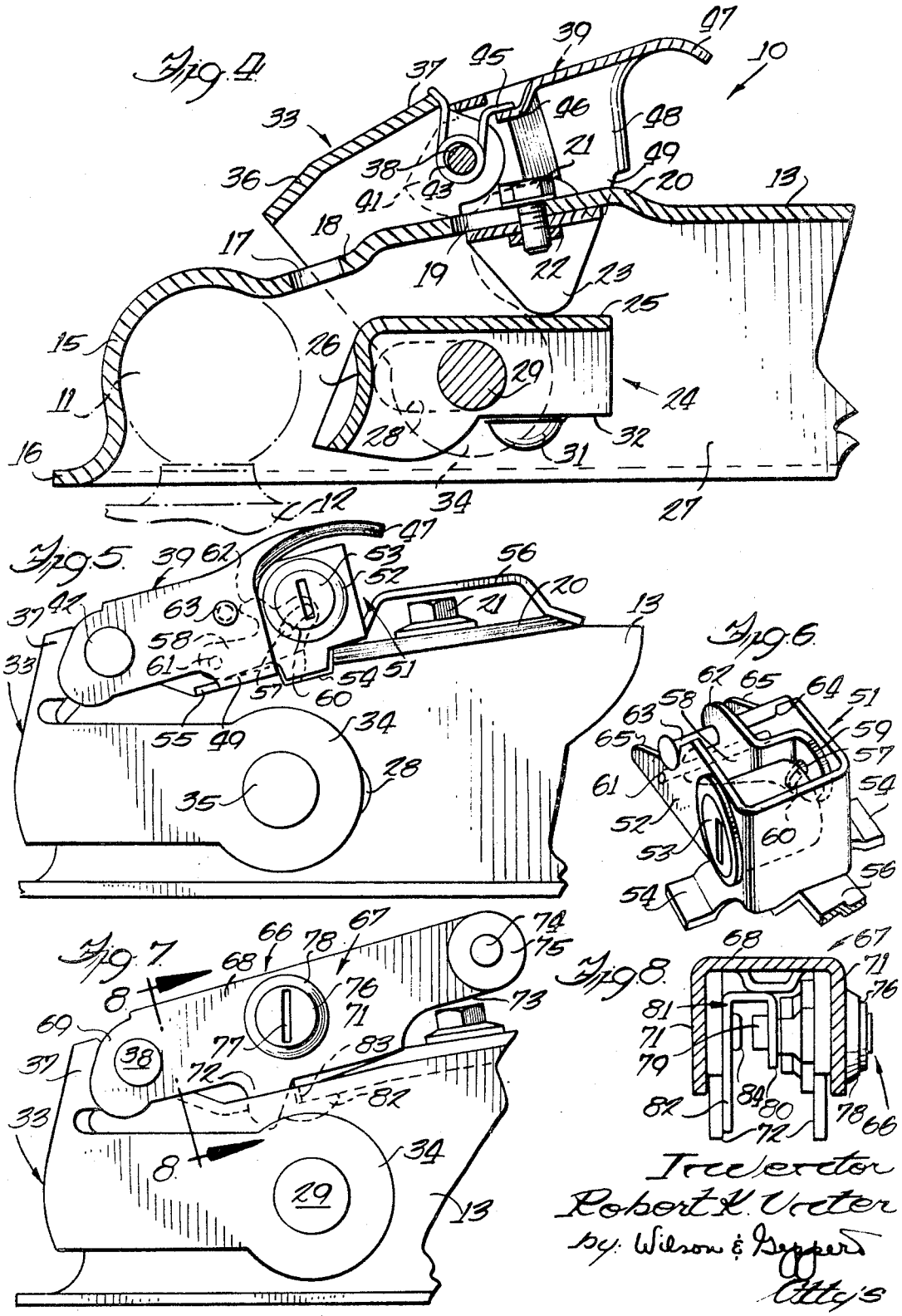

United States Patent Office 3,467,409
Patented Sept. 16, 1969

3,467,409
LOCKING MEANS FOR TRAILER COUPLINGS
Robert K. Unter, Rockford, Ill., assignor to Keystone Consolidated Industries, Inc., Rockford, Ill., a corporation of Delaware
Filed Jan. 2, 1968, Ser. No. 695,197
Int. Cl. B60d 1/06
U.S. Cl. 280—513        7 Claims

ABSTRACT OF THE DISCLOSURE

Locking means for a trailer coupling on the forward end of the frame of a trailer to be connected to a vehicle having a ball member mounted on the frame thereof. The coupling includes a downwardly opening housing forming a portion of the ball socket and a ball clamp forming the remainder of the socket is reciprocably mounted in the housing. The ball clamp is actuated by a latching lever which is pivotally mounted on a yoke that is connected to the ball clamp, and the locking means is positioned between the latching lever and the housing. In one form the locking means includes a lock housing secured on the coupling housing and having a tumbler lock with a rotatable plug and a lock bolt pivotally mounted at one end in the lock housing and at the other end to a pin on the plug. The lock bolt has a hook portion intermediate the ends cooperating with a pin in the latching lever. In another form, the tumbler lock is mounted in the latching lever and actuates a rotatable bolt having a hook end which engages the edge of a slot in the coupling housing.

---

The present invention relates to a locking means for a trailer coupling having a ball cooperating with a socket and more particularly to a locking mechanism including a tumbler lock and lock bolt positioned between a latching lever actuating the coupling and the housing for the ball socket.

Among the objects of the present invention is the provision of locking means for a trailer coupling having a manually operable ball clamp in a coupler body acting to clamp a ball attached to an automotive vehicle. The ball clamp is quickly and easily actuated through a latching lever mounted on the coupler body. A lifting movement of the latch lever causes reciprocation of the ball clamp which is located within the coupler body to open a ball socket therein. The latching lever is easily accessible at the top of the coupler body and the release of the ball clamp does not require any great exertion on the part of the person using the coupling.

Another object of the present invention is the provision of locking means for a trailer coupling having a reciprocally mounted ball clamp within the coupler housing and movable between a clamped and an unclamped position. The ball clamp is actuated by upward and rearward movement of a latching lever relative to the coupling housing with the latching lever being normally positioned above and generally parallel to the top surface of the housing. Locking means is positioned between the latching lever and the housing to prevent upward movement of the latching lever.

A further object of the present invention is the provision of locking means for a trailer coupling to lock the latching lever in the ball clamping position. A suitable lock, such as a tumbler lock, is located within a lock housing mounted on the coupling housing and actuates a pivotally mounted lock bolt that extends into the latching lever. The latching lever is provided with a lock pin extending across the latching lever and the pivotal bolt terminates in a hook portion which engages the lock pin.

The present invention also comprehends the provision of locking means for a trailer coupling having a locking mechanism located within and mounted in the latching lever of the coupling. The lock actuates a rotatable bolt which extends downward from the lever into an opening or slot in the coupler body and terminates in a hook end engaging the edge of the opening for the bolt to prevent lifting of the lever.

Further objects are to provide a construction of maximum simplicity, efficiency, economy and ease of assembly and operation, and such objects, advantages and capabilities as will later more fully appear and are inherently possessed thereby.

In the drawings:

FIGURE 1 is a side elevational view of the end of a trailer coupling assembly showing a reciprocable ball clamp in clamping position.

FIG. 2 is a top plan view of the trailer coupling assembly of FIG. 1.

FIG. 3 is a vertical cross sectional view of the trailer coupling assembly taken on the line 3—3 of FIG. 2.

FIG. 4 is a vertical cross sectional view similar to FIG. 3, but showing the coupling in the unclamped position.

FIG. 5 is a side elevational view of the trailer coupling assembly of FIG. 1, but showing one embodiment of lock assembly utilized to lock the coupling in its clamped position.

FIG. 6 is a partial perspective view of the lock assembly showing the lock housing and lock bolt.

FIG. 7 is a side elevational view of the trailer coupling showing a second embodiment of lock assembly.

FIG. 8 is a cross sectional view of the lock and latching lever taken on line 8—8 of FIG. 7.

Referring more particularly to the disclosure in the drawings wherein is shown illustrative embodiments of the present invention, FIG. 1 discloses a trailer coupling assembly 10 adapted to receive a ball 11 mounted on a frame 12 secured to an automotive vehicle. The coupling 10 includes a downwardly opening coupler body 13 having a rounded outer end 15 forming a portion of a socket 14 to receive and retain the ball 11; the rounded end terminating in an outwardly flared lip 16 designed to aid in guiding the ball into the socket. Rearwardly of the rounded end 15 is a pair of spaced openings 17 in the upper surface 18 of the body and spaced rearwardly of openings 17 is an elongated slot 19 in a raised longitudinal portion 20 to receive a bolt 21 having a nut 22 to adjustably mount a generally U-shaped wedge 23 in the interior of the body 13.

Forming the remainder of the socket 14 is a reciprocably mounted ball clamp 24 having a generally U-shaped body 25 terminating at its forward end in a concave surface 26 extending across the end of the clamp body 25 and adapted to engage the ball 11. The side walls 27 of the coupler body 13 are each provided with an elongated slot 28 receiving a rivet or pin 29 which extends through the slots 28 in the coupler body 13 and through complementary openings in the ball clamp body 25 to allow reciprocable movement of the rivet and ball clamp 24 between clamping (FIG. 3) and unclamping (FIG. 4) positions. As seen in FIGS. 3 and 4, each side wall 27 of the body 13 has an indentation 31 upon which the lower edge 32 of the ball clamp body rides, and the upper surface of the ball clamp body engages and is guided by the wedge 23.

A generally U-shaped yoke 33 having arms 34 each provided with an opening aligned with and receiving an end of the rivet or pin 29, with the rivet being headed at each end as at 35 to secure the yoke 33 thereto. The forward curved connecting portion 36 of the yoke 33 has an upwardly extending portion 37 which is provided with openings to receive a pivot pin or rivet 38 extending across the upper portion 37 of the yoke. A generally U-shaped downwardly opening latching lever 39 has a pair of forward arms or bifurcations 41 having openings to receive the rivet 38, the rivet being headed at its ends 42.

A coil spring 43 is mounted on the rivet or pin 38 and has one arm 44 bearing against the edge of the upper yoke portion 37 and an opposite arm 45 extending through the lever and bearing downward against the top surface of a depression 46 formed in the surface of the latching lever 39 to urge the lever toward the coupler body 13. The latching lever 39 terminates at its rear end in a slightly downwardly curved and laterally extending lift portion 47, and the sides 48 of the lever each have a depending projection 49 which is received in one of the openings 17 to position the latching lever 39 in latched position.

In operation, the trailer coupling lock is shown in its normal clamping position in FIGS. 1–3. To move the ball clamp 24 to the unclamped position to release a ball 11 from or allow the ball 11 to enter the socket 14, the lift portion 47 of the latching lever 39 is manually lifted against the force of the spring 43 and moved rearwardly relative to the coupler body 13. Raising the lever 39 removes the projections 49 from the openings 17 and causes the yoke 33 to begin to pivot around the rivet or pin 29. Movement of the lever rearwardly causes the yoke 33 to further pivot and to move rearwardly relative to the body 13 and to move the rivet 29 rearwardly in the slots 28. Rearward movement of the rivet 29 results in simultaneous rearward movement of the ball clamp 24 guided by the opposed indentations 31 and the U-shaped wedge 23 to the position of FIG. 4. In this position, the coupler body 13 can be lifted off of or lowered onto the ball 11 mounted on a vehicle. The ball 11 is clamped in the socket 14 by a reversal of the movement of the ball clamp 24, rivet 29, yoke 33 and latching lever 39 until the position of FIG. 3 is reached where the ball 11 is securely clamped in the socket.

FIGS. 5 and 6 disclose an embodiment of trailer coupling having a lock 51 for the latching lever 39, and the elements identical to those of FIGS. 1–4 are given the same numerals. The lock 51 includes a generally U-shaped housing 52 for a tumbler lock 53 adapted to be operated by a suitable key (not shown); the housing having lateral mounting tabs 54 and longitudinal tabs 55 and 56. The tab 56 bridges over the slots 18 and the adjustable bolt 21 to the inner end of the raised portion 20. All of the tabs 54, 55 and 56 are suitably secured to the coupler body 13, as by welding, with the housing 52 positioned below the lift portion 47 of the latching lever 39.

The tumbler lock 53 has a rotatable plug which terminates at its rear end in an offset pin 57 actuating a lock bolt 58 having an offset arm 59 connected to the pin 57 through an arcuate slot 60. The lock bolt is pivotally mounted on a pivot pin 61 extending across the housing and has a hook end 62 spaced above the pivot pin 61. The hook end 62 is adapted to engage a lock pin 63 extending between and secured in the sides 48 of the latching lever 39, the lock pin 63 being received in notches 64 in the sloping edges 65 of the lock housing 52.

The lock 51 is shown in FIG. 6 in the locked position and, as shown in FIG. 5, the latching lever 39 is in latched position with the ball clamp 24 in clamped position. To release the latching lever 39, a proper key is inserted into the tumbler lock 53 and the key and lock plug are rotated in a counterclockwise direction so that the offset pin 57 is moved downwardly in the arcuate slot 60 to cause clockwise movement of the lock bolt 58 about the pin 51 to the position of FIG. 5. The rotation of the lock bolt 58 retracts the hook end 62 away from the locking pin 63 so the latching lever 39 can be lifted by the lift handle 47 to retract the ball clamp 24. To lock the latching lever 39 in its clamping position, the above operations are reversed.

FIGS. 7 and 8 disclose a second form of lock 66 which is mounted within the latching lever 67. The latching lever 67 has a somewhat different configuration than that shown in FIGS. 1–6, in providing an elongated downwardly opening housing 68 having spaced arms 69 receiving the rivet 38 pivotally connecting the lever 67 to the yoke 33 at the upper yoke portion 37. The sides 71 of the housing have the depending projection 72 entering the openings 17 of the coupler body 13, and the housing terminates in a pair of spaced arms 73 receiving a rivet or pin 74 to secure a lift handle 75 thereto.

The lock 66 includes a rotatable plug 76 having a keyway 77, the plug being rotatable in the lock housing 78. The rear end of the plug 76 terminates in a square shank 79 received in a complementary opening in one arm 80 of a generally U-shaped rotatable lock bolt 81 having a depending hook end 82 adapted to enter an opening 17 and engage under the rear edge 83 of the opening inside of the projection 72 to prevent raising of the latching lever 67. To release the latch lever 67, the key is inserted into the lock keyway 77 and the key and plug 76 rotated in a clockwise direction to rotate the lock bolt 81 and move the hook end 82 in an arcuate path out of the opening 17 to release the lever 67 for unclamping movement. A pin 84 on the side 71 of the housing 68 opposite the lock is received in an opening in the hook arm 82 to provide stability of rotation for the lock bolt 81.

Having thus disclosed my invention, I claim:

1. Locking means for a releasable trailer coupling having a socket to receive a ball secured to a vehicle and a downwardly opening housing secured to a trailer with the housing forming a portion of the socket and reciprocable clamping means forming the remainder of the socket, comprising a latching lever pivotally mounted at one end on the housing and actuating the clamping means and terminating at the opposite end in a gripping portion, a lock housing secured to the upper surface of said first mentioned housing under the gripping portion of said latching lever, a tumbler lock mounted in said lock housing and having a rotatable plug, a lock bolt pivotally mounted in said lock housing and operatively connected to said rotatable plug, and a hook arm on said lock bolt adapted to engage said latching lever to prevent actuation thereof.

2. Locking means for a releasable trailer coupling as set forth in claim 1, in which said rotatable plug terminates at its rear end in an offset pin, and said lock bolt has an arcuate slot therein receiving said pin to provide for arcuate movement of the lock bolt upon rotation of said plug.

3. Locking means for a releasable trailer coupling as set forth in claim 2, including a pivot pin in said housing extending through said lock bolt to provide a pivotal axis therefor, and a lock pin extending across said latching lever to be engaged by the hook arm of the lock bolt.

4. Locking means for a releasable trailer coupling as set forth in claim 3, in which said lock bolt is an elongated member having an opening to receive said pivot pin adjacent one end thereof and said arcuate slot adjacent the opposite end, and said hook arm extending upward from said member intermediate the ends.

5. Locking means for a releasable trailer coupling as set forth in claim 1, in which said tumbler lock is mounted within said latching lever, a rotatable plug in said tumbler lock and terminating at its rear end in a square shank, said lock bolt having an opening conformably receiving said shank, and a depending hook end on said lock bolt adapted to engage said housing.

6. Locking means for a releasable trailer coupling as set forth in claim 5, in which said latching lever includes a pivot pin aligned with said square shank, and said lock bolt is generally U-shaped having parallel arms, one arm having an opening conformably receiving said square shank and the other arm having an opening conformably receiving said pivot pin.

7. Locking means for a releasable trailer coupling as set forth in claim 6, in which one of said parallel arms terminates in said hook end, and said housing has an elongated slot, said hook end adapted to enter said slot and engage an edge thereof to prevent actuation of said latching lever.

References Cited

UNITED STATES PATENTS

| | | | |
|---|---|---|---|
| 2,149,189 | 2/1939 | Shaffer | 280—507 |
| 2,726,099 | 12/1955 | Nunn | 280—512 |
| 3,163,445 | 12/1964 | Kirk et al. | 280—513 |

BENJAMIN HERSH, Primary Examiner

ROBERT R. SONG, Assistant Examiner